United States Patent [19]
McKenzie

[11] Patent Number: 5,657,179
[45] Date of Patent: Aug. 12, 1997

[54] METHOD FOR REDUCING NOISE DURING TRACK SEEKING IN A DISC DRIVE

[75] Inventor: Lealon R. McKenzie, Edmond, Okla.

[73] Assignee: Seagate Technology, Inc., Scotts Valley, Calif.

[21] Appl. No.: 923,779

[22] Filed: Jul. 31, 1992

Related U.S. Application Data

[63] Continuation-in-part of Ser. No. 738,806, Jul. 31, 1991, abandoned, which is a continuation-in-part of Ser. No. 676,787, Mar. 28, 1991, Pat. No. 5,475,545.

[51] Int. Cl.$^6$ .................................................. G11B 5/596
[52] U.S. Cl. ..................... 360/78.06; 360/78.07
[58] Field of Search .......................... 360/78.04, 78.06, 360/78.07

[56] References Cited

U.S. PATENT DOCUMENTS

| | | | |
|---|---|---|---|
| 3,883,894 | 5/1975 | Johnson | 360/78.06 |
| 4,333,117 | 6/1982 | Johnson | 360/78.07 |
| 4,622,604 | 11/1986 | Hashimoto et al. | 360/78.07 |
| 4,677,507 | 6/1987 | Elliott | 360/78.07 |
| 4,907,109 | 3/1990 | Senio | 360/78.04 |
| 4,931,889 | 6/1990 | Osafune | 360/78.07 |
| 4,937,689 | 6/1990 | Seaver et al. | 360/78.07 |
| 4,956,831 | 9/1990 | Sarraf et al. | 360/78.06 |
| 4,965,501 | 10/1990 | Hashimoto | 318/595 |
| 5,233,486 | 8/1993 | Albert | 360/78.04 X |

OTHER PUBLICATIONS

Brownback, et al., "Proportional Access Profile Anticipate Circuit", IBM Technical Disclosure Bulletin, vol. 23 No. 7B, pp. 3341–3343 (Dec. 1980).

Oswald, "The Servo Channel", from a notebook entitled Head Positioning Servo Systems and High Track Density, A Short Course Mar. 22–24, 1988, 43 unnumbered pages.

*Primary Examiner*—Aristolis Psitos
*Assistant Examiner*—James T. Wilson
*Attorney, Agent, or Firm*—Bill D. McCarthy; Edward P. Heller, III; Randall K. McCarthy

[57] ABSTRACT

A method for reducing noise during track seeking in a disc drive wherein transducers proximate the surfaces of discs of the drive are accelerated away from an initial track in a first sequence of successive time interval and subsequently decelerated toward a destination track in a second sequence of successive time intervals in proportion to the difference between the actual velocity of the transducers and a demand velocity for each of the intervals. The demand velocity in each time interval is the sum of the demand velocity for the previous interval and a velocity demand fraction of the difference between an adjusted profile velocity and the demand velocity for the previous time interval. The adjusted profile velocity is the difference between a stored profile velocity and an anticipator that is maintained at a selected value during acceleration of the transducers and decremented to zero during initial time intervals in which the transducers are decelerated. The velocity demand fraction is incremented from zero to a selected first maximum value during acceleration of the transducers and again incremented to a second maximum value during initial time intervals in which the transducers are decelerated.

2 Claims, 4 Drawing Sheets

METHOD FOR REDUCING NOISE DURING TRACK SEEKING IN A DISC DRIVE

CROSS REFERENCE TO RELATED APPLICATIONS

The present application is a continuation-in-part of U.S. patent application Ser. No. 738,806 entitled "Acoustic Noise Reduction Using Time Varying Exponential Demand Filtering", filed Jul. 31, 1991 and now abandoned, which is a continuation-in-part of U.S. patent application Ser. No. 676,787 entitled "Method for Reducing Noise During Seeks in a Hard Disk Drive", filed Mar. 28, 1991 and now U.S. Pat. No. 5,475,545.

BACKGROUND OF THE INVENTION

1. Field of the Invention

The present invention relates generally to improvements in disc drive servo methods, and, more particularly, but not by way of limitation to improvements in noise reduction during track seeking in a disc drive.

2. Brief Description of the Prior Art

Disc drives are commonly used to provide long term storage of computer programs and files and, to this end, the programs and files are written to concentric data tracks defined on surfaces of rotating discs of the disc drive by transducers which "fly" above the surfaces in close proximity thereto. Subsequently, a program or file can be used by using the transducer to read the program or file for transfer into RAM of a computer with which a disc drive is used. Because of the large data storage capacity of a disc drive, computers having one or more disc drives provide an extremely versatile tool for a wide range of applications and, accordingly, such computers are in widespread use throughout business and industry.

A problem that has arisen with the introduction of computers, with their associated disc drives, into many business environments is that they can inject noise into those environments. The noise, generated by the disc drives, can be very distracting to those who work in such environments, especially in circumstances, increasingly common, in which a number of workers each use separate computers to carry out their assigned tasks.

An important first step in the reduction of noise generated by disc drives has been described in U.S. patent application Ser. No. 07/676,787 entitled "Method for Reducing Noise During Seeks in a Hard Disk Drive" filed Mar. 28, 1991 by Hampshire, McKenzie and Funches and incorporated herein by reference. As described in this United States Patent Application, noise can arise in the movement of the transducers from one data track to another, an operation generally referred to as a "seek" to a destination or target track. To accomplish such movement, the disc drive is comprised of a servo system that keeps track of the current location of the transducers with respect to the tracks on the disc surfaces and includes an electromechanical actuator, upon which the transducers are mounted, that receives control signals generated in part by a servo microcomputer to move the transducers radially across the disc surfaces. A control scheme commonly used is one in which the velocity of the transducers is repetitively compared to one of a plurality of a profile velocities stored in a look-up table that indicates, in relation to the distance between the transducers and the destination track, the velocity the transducers should have for movement to the destination track in accordance with a selected scheme for initially accelerating the transducers from an initial track and decelerating the transducers to the destination track.

A problem with this approach, discussed in the aforementioned U.S. patent application Ser. No. 676,787, now U.S. Pat. No. 5,475,545 is that generation of the control signal from a profile velocity, when the initial and destination track are widely spaced, will result in large acceleration of the actuator at the beginning of a seek and such acceleration has much the same effect as striking the actuator with a mallet. Specifically, to effect a large initial acceleration, the control signal transmitted to the actuator to cause the actuator to follow the velocity profile gives rise to large, rapidly increasing forces in initial portions of a seek that can excite vibration not only in the actuator but in the disc drive case which supports both the actuator and the discs. The result is excessive noise during the initial acceleration of the transducers away from the initial track from which the seek is commenced. As taught in this United States Patent Application, a large reduction in the noise associated with accelerating the transducers from the initial track can be achieved by accelerating the transducers in relation to the difference between the actual velocity of the transducers and a demand velocity that is derived from the stored profile velocities by selecting an initial demand velocity and thereafter incrementing the demand velocity in each of a sequence of time intervals during which the transducers are accelerated by a selected velocity demand fraction of the difference between each new profile velocity taken from the look-up table and the previous demand velocity. Such method will cause the actual velocity of the transducers to asymptotically approach the velocity profile while limiting the forces exerted on the actuator and the rate of change of such forces. Moreover, the method will have only a minimal effect on the time required to accomplish the seek, a consideration that is often of importance to the users of computers.

While the noise reduction method described in the aforementioned U.S. patent application Ser. No. 676,787 now U.S. Pat No. 5,475,545 was an important first step in the reduction of noise during seeks in a disc drive, it has been found that further noise reduction can be achieved during the acceleration the transducers from the initial track and, moreover, that noise arising from deceleration of the transducers can also be limited without significant effect on the operation of the disc drive or significant increase in the time required to effect a seek to a destination track.

SUMMARY OF THE INVENTION

In one aspect of the present invention, the invention provides an improvement on the method described in the aforementioned U.S. patent application Ser. No. 676,787 now U.S. Pat. No. 5,475,545. In the method described therein, the velocity demand fraction is selected on the basis of the distance between the initial and destination tracks and is used to determine the demand velocity at each of a sequence of time intervals throughout the acceleration of the transducers. Thus, the choice of the velocity demand fraction inherently involves a compromise; it must be large enough that the seek will be carried out in a time that is not so large that the seek time becomes excessive but it must be small enough that excessive noise generation, during initial stages of acceleration in which the demand velocity will be have its greatest value, will not occur. The present invention eliminates the necessity of this compromise. More particularly, in one aspect of the invention, the velocity demand fraction is selected to have an initial low value that will result in initial low demand velocities for effective noise reduction and is then incremented in a plurality of time intervals of a first sequence during which the transducers are accelerated to a maximum value that will cause rapid approach of the actual velocity of the transducers to the velocity profile. Thus, significant further noise reduction can be effected without unduly prolonging the seek time.

In a second aspect of the invention, noise generated during deceleration of the transducers is reduced. In the method described in the aforementioned U.S. patent application Ser. No. 676,787, now U.S. patent deceleration is effected by using the profile velocity as the demand velocity and use of the profile velocity has the benefit of minimizing a lag between the actual velocity of the transducers and the profile velocity that is inherent in the use of a velocity profile to effect a seek. Thus, the transducers can be rapidly settled into a track following mode when the destination track is reached.

However, it has been found that the use of the profile velocity as the demand velocity during deceleration gives rise to another source of noise during a seek. Since the profile velocities are stored in a look-up table on the basis of the distance remaining in a seek, the resolution of the control signal transmitted to the actuator will be limited to the change in the profile velocity from one track to the next. As a result, the control signal will exhibit a series of steps corresponding to changes in the stored values of the profile velocity as the transducers approach the destination track. These steps can excite vibration of the actuator and the disc drive case that can give rise to unwanted noise. In the second aspect of the invention, noise generated by control signal resolution is reduced without significant increase in the lag between the actual and profile velocities during later stages in the deceleration of the transducers.

The second aspect of the invention exploits the decrease in actual speed of the transducers as the destination track is approached. Because of this decrease, the time intervals between successive generation of the control signal transmitted to the actuator becomes an increasingly smaller fraction of the time required for movement of the transducers between successive tracks on the discs with the result that a plurality of time intervals will occur for movement of the transducers between successive tracks in later stages of the deceleration of the transducers. Thus, the effect of the lag of the actual velocity with respect to the profile velocity is minimized by the number of time intervals in which the control signal is generated in successive track crossings. Accordingly, noise can be further reduced without excessively affecting the lag by incrementing the demand velocity in each new time interval during deceleration, as well as acceleration, by a fraction of the difference between the profile velocity and the previous demand velocity. As will be clear to those skilled in the art, incrementing the demand velocity in relation to the difference between the profile velocity and the previous demand velocity during deceleration, for which the profile velocity is decreasing, will increase the demand velocity.) Moreover, the effect on the lag of the actual velocity behind the profile velocity can be further minimized by again incrementing the demand velocity fraction as deceleration begins. Thus, noise reduction can again be achieved with little effect on the time required to carry out a seek to a destination track.

In yet a third aspect of the invention, the velocity profile is adjusted to yield a further reduction in noise that arises at the transition from acceleration of the transducers to deceleration. As will be clear to those of skill in the art, at the transition from acceleration to deceleration, the transducers will be moving at the maximum speed they will attain with the result that several tracks will be traversed in each time interval in which each new control signal received by the actuator is generated. As a result, the profile velocity will undergo a series of large changes, resulting in a corresponding large changes in the control signal transmitted to the actuator as deceleration begins. The result, again, will be noise generation.

While the continuation of the generation of the control signal from a demand velocity that is incremented by a fraction of the difference between the profile velocity and the previous demand velocity will tend to minimize this noise, further reduction is desirable. In the third aspect of the invention, the velocity profile is adjusted from a base profile selected on the basis of desired transducer deceleration characteristics and stored to obtain an adjusted velocity profile that exhibits only a slow variation during portions thereof corresponding to initiation of deceleration of the transducers. To this end, the adjusted profile is selected to be the difference between the stored base profile and an anticipator that is selected on the basis of seek length. When deceleration of the transducers begins, the anticipator is decremented to zero in a series of consecutive time intervals in which the control signal is generated. Thus, at times that the transducers are moving at high speed, the profile velocities used to generate the control signals undergo only small changes to again reduce the generation of noise during the seek.

An important object of the present invention is the reduction of noise during track seeking in a disc drive.

Yet another object of the invention is to effect a reduction of noise while minimizing the increase in seek time arising from the noise minimization.

Still a further object of the invention is to minimize noise during terminal portions of seeks to destination tracks.

Another object of the invention is to minimize noise in disc drive track seeking in accordance with a velocity profile resulting from changing values of the profile during high speed movement of transducers across discs of the disc drive.

Other objects, features and advantages of the present invention will become apparent from the following detailed description when read in conjunction with the drawings and appended claims.

DETAILED DESCRIPTION

To provide a basis for describing the method of the present invention, it will be useful to initially present a brief description of a hard disc drive in which the invention might be practiced and methods in which seeks have been carried out in the past. For the first of these purposes, relevant portions of a disc drive, described more fully in U.S. patent application Ser. No. 738,053 entitled "Hard Disc Drive with Improved Servo System" filed Jul. 31, 1992 by Duffy et al., now U.S. Pat No. 5,262,907, issued Nov. 16,1993 the teachings of which are incorporated herein by reference, have been reproduced in FIG. 1 and indicated therein by the general reference numeral 10.

Figure 1:
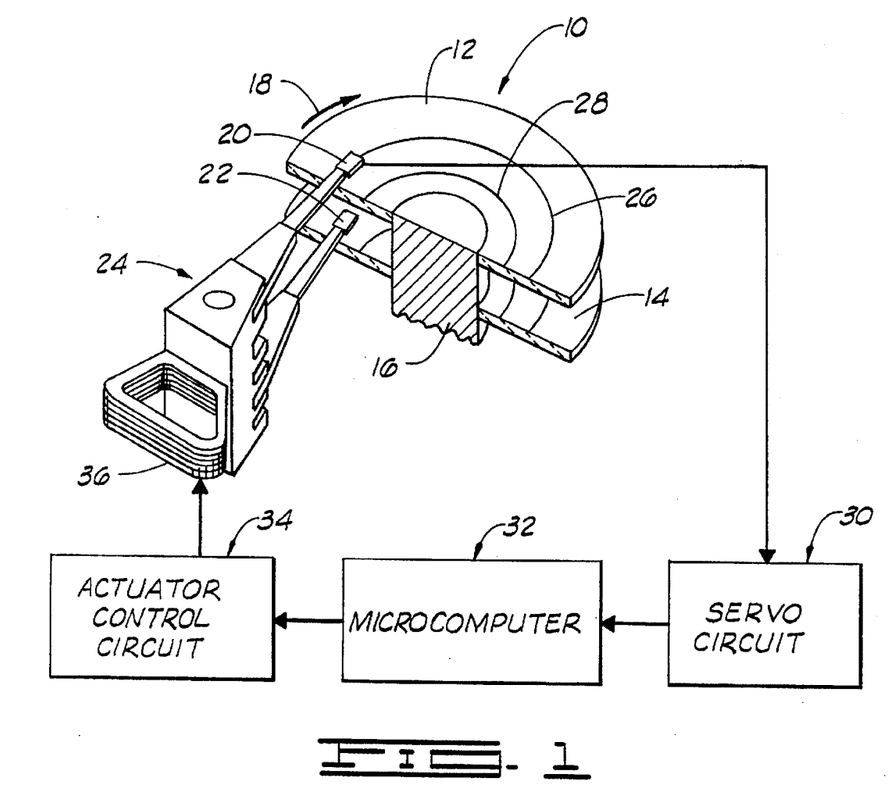
FIG. 1 is a schematic representation of a disc drive in which the method of the present invention may be practiced.

The disk drive 10 is comprised of a plurality of discs, two of which 12, 14 have been shown in FIG. 1, that are mounted on a spindle 16 for rotation in the direction 18 about their common axis. The discs 12, 14 are provided with magnetizable surface coatings so that portions of the surfaces can be magnetized by transducers, two of which have been shown at 20 and 22, that are mounted on a pivotable actuator 24 adjacent the discs 12, 14. During operation of the drive 10, the heads 20, 22 "fly" over the surfaces of the discs 12, 14 respectively in close proximity to the surfaces. The transducers 20, 22 can be used to write information to the disc surfaces or, alternatively, can be utilized to detect changes in the magnetization of disc surfaces so that information written to the disk surface coatings by magnetization of such coatings can be read.

As is conventional, a series of closely spaced concentric tracks, two of which 26, 28 have been shown on the disc 12, are defined on the surfaces of the discs 12, 14. For purposes of explanation and as described in the aforementioned U.S. Pat. No. 5,262,907, it will be assumed herein that the disc drive 10 is of the type that utilizes a dedicated servo surface, read by a servo transducer, to generate signals indicative of the radial locations of the transducers on the surfaces of the discs. More particularly, it will be assumed that the upper surface of the disc 12 is a dedicated servo surface and, as described in aforementioned U.S. Pat. No. 5,262,907, that the tracks 26 and 28 each contain a pattern of magnetized cells indicative of both the track nearest the transducer 20 and the distance between such track and the transducer 20. It will, of course, be recognized that such assumptions are for purposes of explanation only; as will be clear to those of skill in the art, the method of the present invention can be practiced in any disc drive utilizing any servo scheme.

As more fully described in the aforementioned U.S. Pat. No. 5,262,907, the hard disc drive 10 is further comprised of a servo system (not generally designated in the drawings) that is used both to maintain radial alignment of the transducer heads with a selected track in a track following mode of operation of the disc drive and to move the transducer heads in a seek mode of operation from an initial track currently being followed to a selected destination track at a radius at which data is be written to or read from tracks on selected disc surfaces. For purposes of the present disclosure, such servo system can be characterized as comprising a servo circuit 30 that receives signals indicative of the location of the transducers 20, 22 on the surfaces of the discs 12, 14; for example, from the transducer 20, and provides a digital representation of such location to a microcomputer 32 that is programmed to determine a correction signal from the location of the transducers 20, 22 and output such correction signal to an actuator control circuit 34 that, in turn, provides a control signal to an actuator coil 36 on the end of the actuator opposite the end whereon the transducers are supported. The coil 36 is immersed in a magnetic field so that the actuator is accelerated, in either direction, in relation to the control signal. Thus, the actuator 24 can be repetitively repositioned by correction signals generated by the microcomputer 32 to follow tracks in the track following mode and can be accelerated and subsequently decelerated, again by correction signals generated by the microcomputer 32, in the seek mode to move the transducers from the initial track to the destination track.

Figure 2:
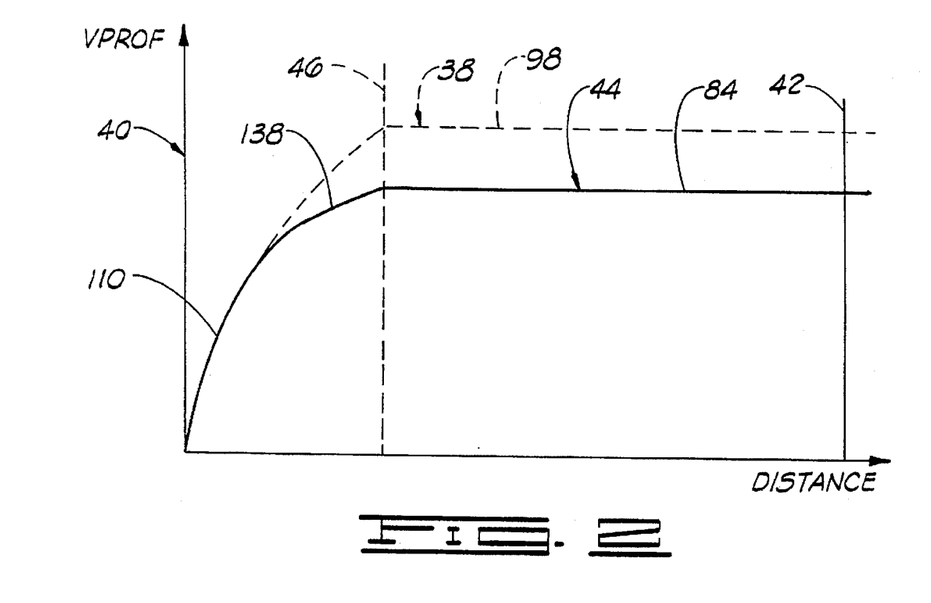
FIG. 2 illustrates velocity profiles utilized in effecting a seek of a transducer across the surface of a disc.

It is conventional to control seeks to a destination track using a velocity profile, a typical prior art example of which has been illustrated at 38 in FIG. 2. wherein the distance to the destination track has been plotted on the abscissa and the profile velocity is plotted on the ordinate. Such velocity profile specifies a profile velocity for various distances from the destination track, represented by the axis 40 in FIG. 2, and such profile velocities decrease to zero as the distance to the destination track approaches zero so that, if the transducers 20, 22 were to follow the velocity profile from an initial track, represented by the line 42 in FIG. 2, to the destination track 40, the transducers would arrive at the destination track with zero velocity. The velocity profile is stored in a look-up table in the microcomputer 32 so that, as seeking has been practiced in the past, the microcomputer 32 repetitively reads transducer location information from the servo circuit 30, determines the actual velocity of the transducers from successive location readings, and compares the actual velocity to the profile velocity for the distance remaining to the destination track to generate the correction signal to be outputted to the actuator control circuit 34. In the context of the present invention, the velocity profile 38 provides a base velocity profile from which is derived an adjusted velocity profile, used in one aspect of the invention, that has been indicated at 44 in FIG. 2.

The present invention contemplates that the base velocity profile 38 can be selected in accordance with any convenient criteria; for example, in accordance with criteria described in the aforementioned U.S. patent application Ser. No. 676, 787, so that the form of the base velocity profile is not limiting; indeed, the base velocity profile may include adaptive components as has been described in U.S. Pat. No. 5,132,855 issued Jul. 21, 1992 to Waugh et al. Features of the base velocity profile that are relevant to the present invention are the large profile velocity values for large separations between the destination track and the transducers 20, 22 and the sharp transition at the distance, indicated by the dashed line 46, at which deceleration of the transducers to the destination track commences in long seeks.

Figure 3:
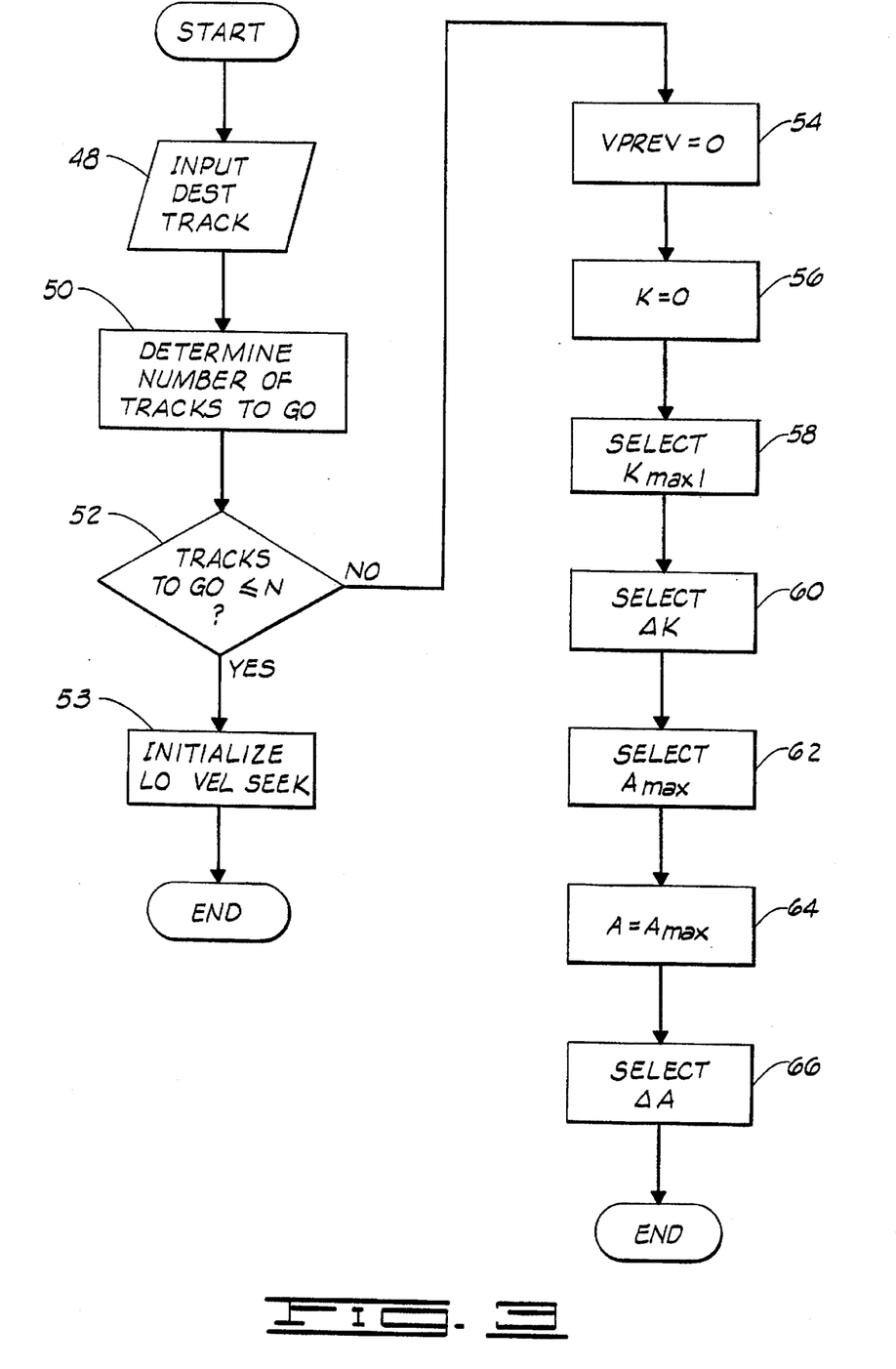
FIG. 3 is a flow chart of a high velocity seek initialization routine executed at the beginning of a seek to a destination track.
Figure 4:
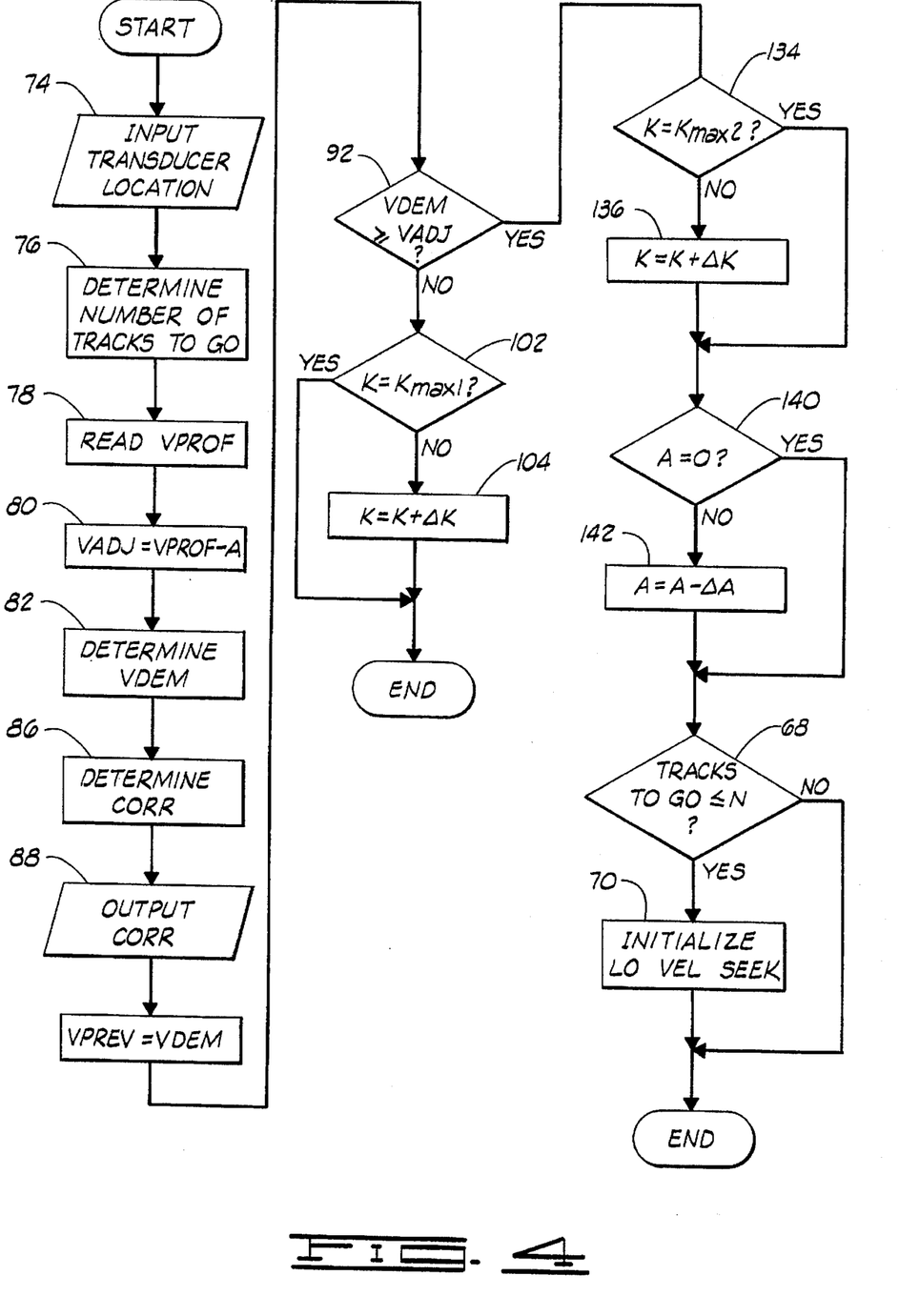
FIG. 4 is a flow chart of a routine that is repetitively executed in the practice of the method of the present invention.

Coming now to the invention, it will be assumed, for purposes of providing a concrete example, that the microcomputer 32 is programmed in the manner that has been described in the aforementioned U.S. Pat. No. 5,262,907 to carry out selected servo routines during interrupts that occur periodically as the discs 12, 14 rotate so that the inventive method is practiced by providing the microcomputer 32 with appropriate interrupt routines. Flow charts for these routines have been presented in FIGS. 3 and 4. More particularly, FIG. 3 presents a flow chart of a seek initialize routine that is carried out prior to seeking a destination track and FIG. 4 presents a flow chart of a high velocity seek routine by means of which major portions of the movement of the transducers 20, 22 to the destination track are effected. It is during the high velocity seek that excessive noise is generated and, consequently, it is during the high velocity seek that the inventive method is practiced. The high velocity seek can be followed by a low velocity seek that is carried out once the transducers 20, 22 have reached a selected distance from the destination track to settle the transducers on the destination track and, generally, such low velocity seek presents substantially no noise problem if the methods of the present invention are practiced in the high velocity seek. The significance of this point will become clear below.

Referring first to FIG. 3, in the first interrupt of the microcomputer 32 that occurs after reception of an appropriate command requiring movement of the transducers 20, 22 to a selected destination track, a seek initialize routine is carried out to select the type of seek to be performed and to select parameters for carrying out the seek. In the first step 48 of the seek initialize routine, the destination track at which the seek is to end is inputted; for example, from a disc drive system microcomputer (not shown) which controls the operation of the disc drive 10 as described in the aforementioned U.S. Pat. No. 5,262,907 and, with current transducer location information received from the servo circuit 30, used to determine, at step 50, the number of tracks to be traversed in the seek. If, as indicated by decision block 52, such number is no greater than a preselected number N; for example 2, a low velocity seek will be initialized, step 53, and the microcomputer 32 will return to its main program. Accordingly, in succeeding interrupts the low velocity seek routine will be executed to effect the movement of the transducer to the destination track. As noted above, the noise reduction method of the present invention will not be practiced in low velocity seeks so that, for purposes of providing a teaching of the present invention, the present disclosure need not consider the manner in which the low velocity seek is carried out.

When the distance between the initial track and the destination track is greater than the selected number N, the interrupt in which the seek initialization routine is carried out continues with the initialization of the high velocity seek that has been indicated in the right hand column of FIG. 3. Initially, the value of a previous velocity, VPREV, for the first of a sequence of first time intervals, each corresponding to an interrupt of the microcomputer 32, is selected at step 54 and preferably such value is selected to be zero.

An initial value, preferably zero, of a velocity demand fraction K to be used in determining demand velocities, VDEM, to which the actual velocities of the transducers are to be compared, is then selected at step 56. During the high velocity seek, signals indicative of the radial location of the transducers 20, 22 are repetitively generated by the servo circuit 30 and read by the microcomputer 32 so that, during each interrupt, the actual radial velocity, VACT, of the transducers 20, 22 across the discs 12, 14 can be determined by dividing the change in location by the time between successive interrupts. Conveniently, such time in the servo system described in the aforementioned U.S. Pat. No. 5,262, 907 is constant. However, such need not be the case; methods for determining the speed of the transducers are well known. The correction signal, CORR, to be outputted to the actuator control circuit 34 is then determined by the relation $$CORR=C[VDEM-VACT], \quad (1)$$

where C is a constant, as is conventional in the art.

Following initialization of the velocity demand fraction, a maximum value, Kmax1, the velocity demand fraction is to have during acceleration of the transducers 20, 22 is selected, step 58, and a velocity demand fraction increment $\Delta K$ is selected at step 60. The manner in which these quantities are selected and their use in the practice of the present invention will be discussed below.

The high velocity initialization routine is then completed by selection of the maximum value, Amax, that an anticipator A is to have for the seek that is to be performed, step 62, initialization of the anticipator A to Amax, step 64, and the selection, at step 66, of an anticipator increment $\Delta A$. The selection of the anticipator maximum value and the value for the anticipator increment, as well as the use of the anticipator in the practice of the present invention will be described below.

Once the high velocity seek has been initialized, the seek will be carried out by repetitively executing the high velocity seek routine that has been presented in FIG. 4. More specifically, such routine is executed at each interrupt of the microcomputer 32 until the number of tracks remaining to be traversed by the transducers 20, 22 is no greater than the number N for which a low velocity seek would have been executed as described above. When such condition occurs, a low velocity seek is initialized and the movement of the transducers is completed in a plurality of executions of the low velocity seek routine. To this end, the high velocity seek routine concludes with the determination of whether the distance remaining in the seek is less than or equal to such number, decision block 68, and, if so, initializes the low velocity seek routine, step 70, for execution in subsequent interrupts in which the seek is completed.

At the beginning of each interrupt during movement of the transducers 20, 22 toward the destination track using the high velocity seek routine, the transducer location is inputted into the microcomputer 32 from the servo circuit 30 and an initial determination, step 76, is made of the number of tracks remaining to be traversed by the transducers 20,22 to reach the destination track, block 76. Since, as described above, the velocity profile is established on the basis of distance to the destination track, the value of the profile velocity to be used to determine the correction signal in the current interrupt is also determined and is subsequently read, step 78, from the look-up table in which the velocity profile is stored.

In the past, the profile velocity read at step 78 has been used as the demand velocity for determination of the correction signal or, as taught in the aforementioned U.S. patent application Ser. No. 676,787, has been used as a basis for determining the correction signal in a manner that will be discussed in more detail below. In the present invention, an adjusted profile velocity, VADJ, derived from the profile velocity VPROF in accordance with the relation $$VADJ=VPROF-A, \quad (2)$$

where A is the aforementioned anticipator, is determined at step 80 for use in the place of VPROF to provide a basis for the determination, at step 82, of the demand velocity VDEM from which the correction signal is to be determined for output to the actuator control circuit 34. It will be noted that, since the anticipator value has been initialized to Amax, the adjusted profile velocity will initially be the difference between the profile velocity and the maximum value of the anticipator. As will become clear below, such value of the anticipator is maintained throughout a first sequence of time intervals, each corresponding to an interrupt in the servo system described in the aforementioned U.S. patent application Ser. No. 738,053, during which the transducers 20, 22 are accelerated from the initial track. Thus, where the base velocity profile has the form indicated at 38 in FIG. 2, initial portions of the adjusted velocity profile will have the form indicated at 84 in FIG. 2.

As in the noise reduction method described in the aforementioned U.S. patent application Ser. No. 676,787, the demand velocity in each of the first sequence of time intervals in which the transducers are accelerated away from the initial track is determined by incrementing the previous demand velocity and it is to provide a previous demand velocity for the first time interval during which the acceleration takes place that the previous demand velocity was initialized as described above. In the practice of the present invention, the demand velocity in each of the first sequence of time intervals in which the transducers 20, 22 are accelerated away from the initial track is determined in accordance with the relation $$VDEM=K[VADJ-VPREV]+VPREV, \quad (3)$$

where K is the velocity demand fraction that has been initialized, as noted above, during the execution of the high velocity seek initialization routine.

As the high velocity seek routine continues, in each interrupt of the microcomputer 32, the correction signal CORR is determined, step 86, from the demand velocity as described above and outputted, step 88, to the actuator control circuit 34 to cause a force to be exerted on the actuator 24 to cause an acceleration or deceleration of the actuator 24 that will tend to drive the speed of the actuator 24 toward the adjusted velocity demand profile that has been determined for that interrupt. The value of the previous demand velocity, VPREV, is then updated to the demand velocity that has been determined for the current interrupt at step 90. Following the updating of VPREV, the demand velocity is compared to the adjusted profile velocity, step 92, to determine whether the transducers 20, 22 have reached a distance from the destination track at which deceleration is to be commenced. Since, during acceleration of the transducers 20, 22, the adjusted profile velocity is the difference between the base profile velocity and the constant maximum value Amax of the anticipator, the adjusted velocity profile 44 will decrease when the distance indicated at 46 in FIG. 2 is reached; that is, when portions of the velocity profile corresponding to deceleration of the transducers 20, 22 to the destination track are reached. Thus, a suitable criterion for initiation of deceleration of the transducers 20, 22, to be described below, is that the demand velocity for the present interrupt has become at least as large as the adjusted profile velocity for that interrupt.

It will be noted that, with the exception of the use of the adjusted velocity profile in place of the stored base velocity profile and a difference to be discussed below, the initial steps of the high velocity seek routine recited above are the steps by means of which the transducers 20, 22 are accelerated in the noise reduction method described in the aforementioned U.S. patent application Ser. No. 676,787. As a result, the demand velocity will asymptotically approach the adjusted profile velocity in a manner that is similar to that described in the referenced patent application. However, the initial values of the demand velocity will differ substantially from those for the referenced method in a manner that has been illustrated in FIG. 5A wherein the increase in the demand velocity for the noise reduction method of the present method has been contrasted with that taught in the referenced United States Patent Application. Before continuing with the discussion of the method of the present invention, it will be useful to briefly describe the variation in the demand velocity and actual velocity of the transducers during acceleration away from the initial track in the practice of the noise reduction method taught in the aforementioned U.S. patent application Ser. No. 676,787 to provide a full appreciation of the method of the present invention.

Figure 5A:
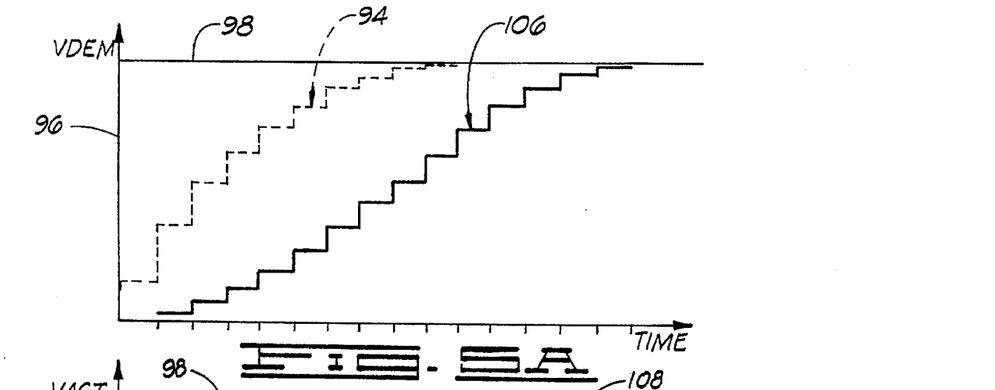
FIG. 5A is a graph illustrating the demand velocity during acceleration of the transducers of the disc drive in relation to time.
Figure 5B:
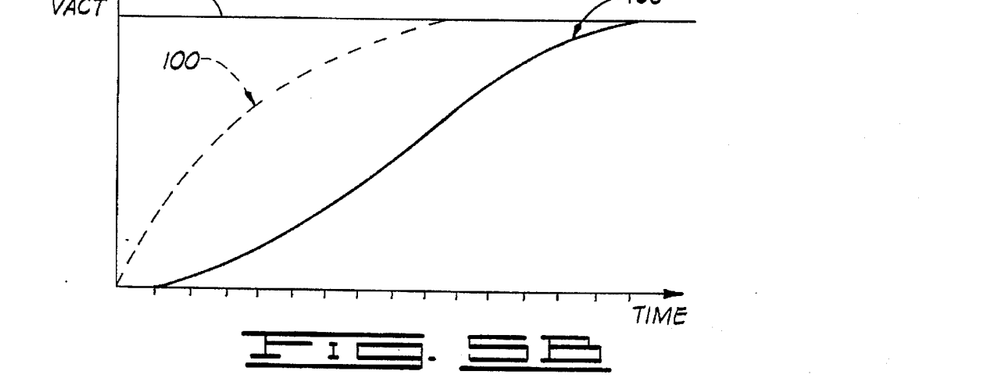
FIG. 5B is a graph illustrating the actual velocity during acceleration of the transducers of the disc drive in relation to time.

Referring to FIG. 5A, shown in dashed line and designated by the reference numeral 94 is a plot of the variation with time of the demand velocity during initial acceleration of the transducers 20, 22 away from the initial track, represented by the vertical axis 96, in accordance with the noise reduction method taught in the aforementioned U.S. patent application Ser. No. 676,787. (For clarity of illustration, the time intervals in FIG. 5A have been greatly exaggerated.) Since, in such method, the demand velocity is increased from the previous demand velocity in each of a sequence of time intervals during which acceleration takes place by an amount proportional to the velocity demand fraction of the difference between the profile velocity and the previous demand velocity, the demand velocity will increase during acceleration in a series of steps; that is, from one time interval during which the correction signal is generated to the next, that asymptotically approach the velocity profile which has been indicated at 98 if FIG. 5A. (In the practice of the method taught in the referenced U.S. patent application Ser. No. 676,787, the portion of the velocity profile shown in FIG. 5A would be the portion of the base velocity profile indicated by the reference numeral 98 in FIG. 2. In the present invention, the portion of the velocity profile shown in FIG. 5A would be the portion 84 of the adjusted velocity profile shown in FIG. 2. For comparison purposes, the difference between the base and adjusted velocity profiles has not been indicated in FIG. 5A.) The result of the asymptotic approach of the demand velocity toward the velocity profile on the actual velocity of the transducers 20, 22 has been indicated FIG. 5B by the dashed line 100. As shown therein, the actual velocity will also asymptotically approach the velocity profile which has similarly been indicated by the line 98 in such graph.

As will be clear to those of skill in the art, the rate at which the demand and actual velocities approach the velocity profile will depend upon the value of the velocity demand fraction K so that the transducers 20, 22 will be slowly accelerated for low values of the velocity demand fraction and more rapidly accelerated for larger values of the velocity demand fraction. Thus, since noise is generated by the acceleration of the transducers 20, 22, noise can be reduced by selecting a low velocity demand fraction but the price that must be paid for such selection is an increase in the time required for the actual velocity of the transducers to become substantially equal to the profile velocity corresponding to the initial portion 98 of the velocity profile. Accordingly, while the method described in the aforementioned U.S. patent application Ser. No. 676,787 provides a useful way of limiting noise in the movement of transducers between tracks on discs of a disc drive, it is limited by a need to carry out such the movement in a short time. As will now be described, present invention provides a noise reduction method in which noise alone can be the criterion for determination of the velocity demand fraction.

As noted above with respect to FIG. 3, the velocity demand fraction is initialized to a low value, which can be zero, prior to commencement of the seek so that the demand velocity for the initial one of a first sequence of time intervals provided by the interrupts of the microcomputer 32 is made very small for suppression of noise while the transducers 20, 22 undergo acceleration. However, in contrast to the method described in the aforementioned U.S. patent application Ser. No. 676,787, the velocity demand fraction does not have a fixed value in the practice of the present invention. Rather, following the comparison of the demand velocity and the adjusted profile velocity at step 92 in FIG. 4 and during acceleration of the transducers 20, 22, the value of the velocity demand fraction is compared to the value Kmax1, step 102, that has been selected at step 58 of FIG. 3 and, if the velocity demand fraction for the current time interval is less than Kmax1, the velocity demand fraction is incremented, step 104, by the velocity demand fraction increment ΔK that has been selected at step 60 of FIG. 3. As a result, the velocity demand fraction will increase to cause the demand velocity and the actual velocity of the transducers to asymptotically approach the profile velocity in very little additional time than is required to cause such approach by the use of a suitable constant value for the velocity demand fraction as has been illustrated by the curves 106 and 108 in FIGS. 5A and 5B respectively. However, because of the low initial value of the velocity demand fraction, the transducers 20, 22 will undergo an initial acceleration that can be selected to be very small to provide a strong noise suppression effect. Thus, both the maximum value of the velocity demand fraction and the increment thereof can be selected to suppress noise with very little effect on the time required to perform a seek.

In the noise reduction method described in the aforementioned U.S. patent application Ser. No. 676,787, only noise generated by the acceleration of the transducers is suppressed. However, noise can also be generated during deceleration of the transducers and, in two additional aspects of the present invention, the invention provides a method for reducing noise during the deceleration of the transducers.

Figure 6:
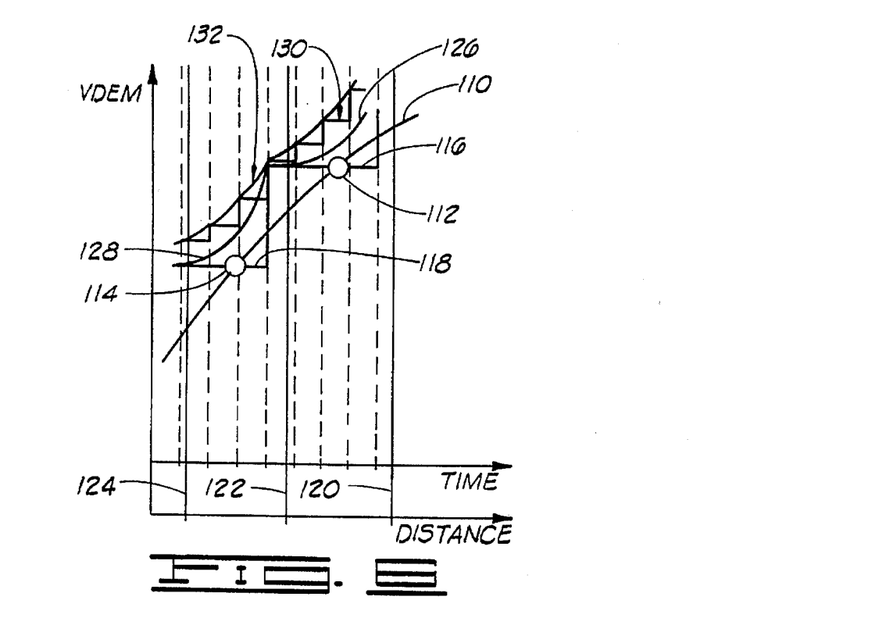
FIG. 6 is a graph illustrating the demand velocity during deceleration of the transducers in relation to time and distance to the destination track.

The first of these two further aspects of the invention is based on the discovery of a hitherto unrecognized source of noise that is illustrated in FIG. 6 wherein is illustrated, at 110, a portion of the velocity profile for relatively low speeds of the transducers 20, 22 that will occur as the transducers 20, 22 near the destination track. More particularly, the portion 110 is a reproduction on an enlarged scale of portions of both the base and adjusted velocity profiles, similarly designated in FIG. 2, including two successive tracks whose centers are indicated by the circles 112 and 114.

As will be clear to those of skill in the art, the decrease in speed of the transducers as the transducers approach the destination track will cause the time required for the transducers 20, 22 to traverse the distance between successive tracks to become increasingly longer as the transducers 20, 22 approach the destination track and such effect has been illustrated by plotting the demand velocity in FIG. 6 in relation to both time and distance remaining in the seek. For the portion 110 of the velocity profile shown, the distance between successive tracks corresponds to substantially three time intervals in which the correction signal is determined and outputted by the microcomputer 32.

As will further be recognized by those of skill in the art, a look-up table in a microcomputer can store only a discrete set of values so that, while the profile velocities corresponding to the tracks 112 and 114 can be stored, profile velocities for intermediate distances cannot be. Thus, if, as is conventional, the demand velocity is selected to be the profile velocity during deceleration, the demand velocity that will be used in the determination of the correction signal will be substantially that for the nearest track at the time that a time interval in which the correction signal is generated begins. (Extrapolation to obtain a more precise value of the velocity profile is generally used in low velocity seeks in which the transducers are moving relatively slowly but not in high velocity seeks, because the motion of the transducers at higher velocities will limit the resolution of the transducer location measurement by the servo circuit 30.) Thus, the demand velocity would exhibit a series of steps, two of which have been illustrated at 116 and 118 in FIG. 6 that extend substantially to the midpoints, indicated by the vertical lines 120, 122 and 124, between successive tracks. As a result, the actual velocity would exhibit a series of arcs 126,128 that approximate a straight line modulated with a periodic curve. Consequently, the acceleration of the transducers will have a generally triangular wave form that produces noise.

In the simplest implementation of a second aspect of the present invention, such noise is suppressed by continuing the determination of the demand velocity from the previous demand velocity, the profile velocity and the demand constant in the manner that the demand velocity is determined during acceleration of the transducers 20, 22. Hence, in a second aspect of the present invention, the steps 74 through 90 of the routine illustrated in FIG. 4 for determining the correction signal during acceleration of the transducers is carried into deceleration of the transducers. As a result, the demand velocity during latter stages of deceleration will generally have the form illustrated at 130 in FIG. 6 and the actual velocity will follow a curve having the general form illustrated at 132 in FIG. 6. As can be seen by comparison with the curve 126, variations or the actual velocity from a constant value are much reduced to provide a quieter seek.

Thus, the present invention contemplates that the transducers will be accelerated in a first sequence of time intervals in which the correction signal outputted to the actuator control signal is proportional to the difference between a demand velocity that is determined in accordance with equation (3) and the actual velocity of the transducers and subsequently decelerated toward the destination track, in a second sequence of time intervals, in which the correction signal is determined in the same manner. While a significant reduction of seek noise can be effected in this manner, such method of decelerating the transducers can also give rise to a problem. As indicated by the actual velocity curves 126 and 132 in FIG. 6, the actual velocity of the transducers 20, 22 will lag the profile velocity and, further, the extent to which the actual velocity lags the profile velocity will generally be larger for the case in which the demand velocity in each time interval is determined from equation (3) as described above as opposed to being selected to be the profile velocity as taught in the aforementioned U.S. patent application Ser. No. 676,787. Such lag can interfere with settling of the transducers 20, 22 on the destination track in a subsequent low velocity seek by increasing the deceleration of the transducers 20, 22 required to bring the transducers substantially to rest as the destination track is reached. Moreover, the increased acceleration during settling can itself be a source of noise.

To limit the lag, the velocity demand fraction is increased to a second maximum value Kmax2 in a plurality of initial time intervals of the second sequence in which the transducers are decelerated toward the destination track. More particularly, in each time interval, the value of the velocity demand fraction is compared to the second maximum value of the velocity demand fraction, at step 134, and the velocity demand fraction is incremented, at step 136, in each time interval of the second sequence in which such fraction is less than Kmax2.

The second further aspect of the present invention for reducing noise during deceleration of the transducers is concerned with the use of an adjusted velocity profile in place of the base velocity profile that stored in the microcomputer to determine the demand velocity that is outputted to the actuator control circuit 34 in each of the first and second sequences of times intervals in which the transducers are accelerated and decelerated respectively. Returning to FIG. 2, it has been noted that the base velocity profile undergoes a sharp change in slope at the distance from the destination track, indicated by the dashed line 46, at which deceleration of the transducers 20, 22 is to commence. Moreover, as will be recognized by those of skill in the art, such change occurs at a time that the actual speed of the transducers 20, 22 is a maximum so that the transducers may traverse a number of tracks in time intervals of the second sequence immediately following the transition from acceleration of the transducers to deceleration of the transducers. Accordingly, the profile velocity can change substantially between successive time intervals during initial stages of deceleration to result in changes in the demand velocity that will give rise to noise.

The purpose for using the adjusted velocity profile 44 is to reduce noise arising from this source. More specifically, the use of the adjusted velocity profile 44 permits the constant profile velocity portion of the velocity profile used during acceleration of the transducers 20, 22 to be caused to undergo a slow transition to that portion 110 in which the high velocity seek is completed as indicated at 138 in FIG. 2. To this end, the adjusted velocity profile is derived from the stored base velocity profile by decreasing the base velocity profile by the anticipator A, initializing the anticipator to a selected maximum value at step 64 in FIG. 3 and by decrementing the anticipator to zero during a plurality of time intervals of the second sequence in which the transducers are decelerated. More particularly, as shown in FIG. 4, following the comparison of the velocity demand fraction with Kmax2, and incrementing such fraction if necessary, the anticipator A is compared to zero, step 140, and decremented by the selected anticipator increment ΔA, step 142, in time intervals of the second sequence during which the transducers are decelerated in which the anticipator is not zero. Thus, the adjusted velocity profile is selected to be the base velocity profile less the maximum value of the anticipator during acceleration of the transducers and is incremented, by decrementing the anticipator, during a number of time intervals of the second, or deceleration, sequence that is selected by the selection of the anticipator increment in relation to the maximum value of the anticipator.

As will be clear from the above description of the practice of the present invention, a number of seek parameters are utilized in carrying out high velocity seeks and, more importantly, the values of these parameters can be chosen to minimize the generation of noise during such seeks. More specifically, the parameters are the two maximal values, Kmax1 and Kmax2, the velocity demand fraction is to attain during acceleration and deceleration respectively, the maximum value Amax of the anticipator and the velocity demand fraction and anticipator increments ΔK and ΔA respectively. The present invention contemplates that these parameters will be selected on a basis of seek length for each type of disc drive in which the method of the present invention is practiced. A convenient way of determining the parameters will now be described.

For each of a selection of disc drives of a specific type, the microcomputer 32 is replaced by a programmable emulator which permits the values of the seek parameters to be selected for seeks having lengths that are similarly selectable and an accelerometer (not shown) is mounted on the case (not shown) of the disc drive so that vibration of the case can be monitored on an oscilloscope in the manner described in the aforementioned U.S. patent application Ser. No. 676, 787. For each of the selection of disc drives, seeks of varying lengths are performed using a selection of values of Kmax1 and, for each value of Kmax1, a selection of values of the velocity demand fraction increment ΔK while observing the accelerometer output and, at the same time listening to the disc drive. During this initial step Kmax 2 can be set equal to Kmax1 and Amax can be set to zero to isolate the effect of the varying the velocity demand fraction during acceleration. For each seek length, the values of Kmax1 and ΔK that will result in the least amount of noise are thus determined in relation to seek length.

Using these values of Kmax1 and ΔK, seeks of varying lengths are performed using a selection of values of Amax and, for each value of Amax, a selection of values of the anticipator increment ΔA to similarly determine values of Amax and ΔA that will yield a minimum amount of seek noise in relation to seek length. Subsequently, for the same seek lengths and the values of Kmax1, Amax, ΔK and ΔA, seeks of varying lengths are performed using a Selection of values of Kmax2 to similarly determine values of Kmax2 in relation to seek length that will minimize noise during high velocity seeks while not unduly increasing the extent to which the actual velocity of the transducers lags the velocity. profile. Since undue lag will increase noise during settling of the transducers 20, 22 on the destination track, the criterion for undue lag can be that the amount of noise generated during the settling of the transducers on the destination track not exceed the noise generated in terminal portions of the high velocity seek.

While the values of the parameters so obtained will in many cases suffice to minimize noise in seeks, it will be clear that the measurement can be repeated using the so-determined values of Amax, ΔA, and Kmax2 to redetermine Kmax1 and ΔK and similar subsequent redetermination of Kmax2, Amax and ΔA so that, after only a few iterations of the measurements, the values of the parameters that will provide the least seek noise, in relation to seek length, for each disc drive in which the measurements are made can be obtained. Such values are then averaged over a plurality of disc drives of the generic type and stored in the microcomputer 32 when the disc drives are manufactured. A convenient way of storing the values is to generate polynomial expressions that approximate the relationships between the parameters and distance to the destination track and store the coefficients of the polynomials in a look-up table in microcomputer 32 for calculation of the parameters from the location of the transducers. Preferably, the polynomials are sets of linear expressions that, for each parameter, each approximates the variation of the parameter in a selected range of distance to the destination track. Thus, once the number of tracks to go has been determined in step 50 of the seek initialization routine shown in FIG. 3, the appropriate coefficients can be selected and, from the coefficients, the values of the parameters can be determined.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a method for reducing noise in the movement of a transducer across a surface of a disc of a disc drive from an initial track on the disc surface to a destination track on the disc surface, wherein the transducer is accelerated from the initial track during a sequence of time intervals and subsequently decelerated to the destination track, and wherein said method comprises the steps of:

selecting a demand velocity for the first time interval of said sequence of time intervals;

in each succeeding time interval of said sequence of time intervals, incrementing the demand velocity by a velocity demand fraction of the difference between a profile velocity, selected in relation to the distance between the transducer head and the destination track, and the demand velocity for the previous time interval; and accelerating the transducer in relation to the difference between the demand velocity and an actual velocity of the transducer across the disc surface, the improvement wherein the velocity demand fraction is incremented from an initial value selected for the first time interval of said sequence of time intervals in each of a plurality of succeeding time intervals of said sequence of time intervals.

2. The method of claim 1, wherein said sequence of time intervals is characterized as a first sequence of time intervals; wherein the transducer is decelerated toward the destination rack in a second sequence of time intervals following said first sequence; wherein the method further comprises the steps of:

in the first time interval of the second sequence, decelerating the transducer head in proportion to the difference between the actual velocity of the transducer and the sum of the demand velocity for the last time interval of the first sequence and the product of the velocity demand fraction and the difference between demand velocity for the last time interval of the first sequence and a profile velocity selected in relation to the distance between the transducer and the destination track; and in each succeeding time interval of the second sequence of time intervals, decelerating the transducer head in proportion to the difference between the actual velocity of the transducer and the sum of the demand velocity for the previous time interval of said second sequence and the product of the velocity demand fraction and the difference between the demand velocity for the previous time interval of said second sequence and a profile velocity selected in relation to the distance between the transducer and the destination track;

wherein the velocity demand fraction is incremented in each of a succession of time intervals of the second sequence during initial portions of the deceleration of the transducer; and wherein each profile velocity is characterized as an adjusted profile velocity selected as the difference between a previously determined base profile velocity, selected in relation to the distance between the transducer and the destination track, and an anticipator having a preselected maximum value, wherein the value of the anticipator during acceleration of the transducer is selected to be the maximum value of the anticipator; and wherein the method further comprises the step of decrementing the anticipator to zero in a succession of time intervals of said second sequence of time intervals during initial portions of the deceleration of the transducer.

* * * * *

UNITED STATES PATENT AND TRADEMARK OFFICE
CERTIFICATE OF CORRECTION

PATENT NO. : 5,657,179
DATED      : August 12, 1997
INVENTOR(S): Lealon R. McKenzie It is certified that error appears in the above-indentified patent and that said Letters Patent is hereby corrected as shown below:

Column 3, line 10, delete "patent" and insert --Pat. No. 5,475,545,--.

Column 3, line 51, add --(-- before the words 'As will'.

Column 5, line 24, delete "disk" and insert --disc--.

Column 6, line 49, delete "5,252,907to" and insert --5,252,907 to--.

Signed and Sealed this

Eighth Day of September, 1998

BRUCE LEHMAN

Attest:

Attesting Officer

Commissioner of Patents and Trademarks